(12) United States Patent
Cohen

(10) Patent No.: US 11,622,544 B2
(45) Date of Patent: Apr. 11, 2023

(54) ORNAMENT ASSEMBLY

(71) Applicant: Alan J. Cohen, Laurel Hollow, NY (US)

(72) Inventor: Alan J. Cohen, Laurel Hollow, NY (US)

(*) Notice: Subject to any disclaimer, the term of this patent is extended or adjusted under 35 U.S.C. 154(b) by 0 days.

(21) Appl. No.: 16/110,135

(22) Filed: Aug. 23, 2018

(65) Prior Publication Data

US 2018/0360003 A1 Dec. 20, 2018

Related U.S. Application Data

(63) Continuation of application No. 16/028,895, filed on Jul. 6, 2018, which is a continuation of application No. 15/699,734, filed on Sep. 8, 2017, now abandoned, which is a continuation of application No. 15/694,035, filed on Sep. 1, 2017, now abandoned, and a continuation of application No. 15/638,082, filed on Jun. 29, 2017, now abandoned, said application No. 15/694,035 is a continuation-in-part of application No. 15/638,082, filed on Jun. 29, 2017, now abandoned.

(60) Provisional application No. 62/465,346, filed on Mar. 1, 2017.

(51) Int. Cl.
  *A01K 63/00* (2017.01)
(52) U.S. Cl.
  CPC .................. *A01K 63/006* (2013.01)
(58) Field of Classification Search
  CPC .................................................. A01K 63/006
  See application file for complete search history.

(56) References Cited

U.S. PATENT DOCUMENTS

| | | | |
|---|---|---|---|
| 3,744,454 A | | 7/1973 | Willinger et al. |
| 4,006,710 A | * | 2/1977 | Van Berkum ........ A01K 63/006 119/256 |
| 4,006,711 A | | 2/1977 | Frank |
| 4,318,945 A | | 3/1982 | Goldman et al. |
| 4,385,088 A | | 5/1983 | Baskin |
| 4,820,556 A | | 4/1989 | Goldman et al. |
| 4,967,694 A | | 11/1990 | Waldman |
| 4,974,545 A | | 12/1990 | Jones |

(Continued)

FOREIGN PATENT DOCUMENTS

| | | |
|---|---|---|
| CN | 201767350 | 3/2011 |
| CN | 102422804 | 4/2012 |

(Continued)

OTHER PUBLICATIONS

U.S. Patent and Trademark Office, International Search Report and Written Opinion for PCT Application No. PCT/US2018/020122, dated Jul. 24, 2018.

(Continued)

*Primary Examiner* — Magdalena Topolski

(57) ABSTRACT

A method for decorating a housing using a decorative ornament assembly includes a base and plurality of decorative elements irremovably disposed therein. The width and depth of the base is less than or equal to the width and depth of inner surface dimension of the housing such that the bottom inner surface area of the housing is entirely covered by one or more bases. A decorative elements on the decorative ornament assembly is configured for use in easy removal of the assembly from the housing.

14 Claims, 13 Drawing Sheets

(56) References Cited

U.S. PATENT DOCUMENTS

| | | |
|---|---|---|
| 5,451,443 A | 9/1995 | Wechsler |
| 5,855,982 A | 1/1999 | Wechsler |
| 6,006,471 A | 12/1999 | Sun |
| 6,422,175 B1 | 7/2002 | Rudolph |
| 6,672,250 B1 | 1/2004 | Traylor et al. |
| 7,020,946 B2 | 4/2006 | Mele |
| RE39,379 E | 11/2006 | Wechsler |
| D552,305 S * | 10/2007 | Hartje .................. D30/106 |
| 7,836,853 B2 | 11/2010 | Locklear |
| 8,505,490 B1 | 8/2013 | Clonan |
| 8,844,468 B2 | 9/2014 | Lockwood |
| 9,239,139 B2 | 1/2016 | McCauley |
| 2002/0083901 A1 | 7/2002 | Rudolph |
| 2003/0093947 A1 | 5/2003 | Gilberg |
| 2005/0061717 A1 | 3/2005 | Smith |
| 2006/0272962 A1 | 12/2006 | Chan |
| 2008/0022590 A1 | 1/2008 | Chen |
| 2009/0114162 A1 | 5/2009 | Locklear |
| 2014/0209034 A1 | 7/2014 | Lockwood |
| 2015/0230436 A1 | 8/2015 | Lutz et al. |
| 2015/0313190 A1 | 11/2015 | Edwards |
| 2016/0242396 A1 | 8/2016 | Fredricks |

FOREIGN PATENT DOCUMENTS

| | | | |
|---|---|---|---|
| CN | 202618039 | 12/2012 | |
| CN | 203493064 | 3/2014 | |
| CN | 205030219 | 2/2016 | |
| DE | 20207159 U1 * | 8/2002 | ........... A01K 63/006 |
| DE | 202006013495 | 2/2007 | |
| JP | H075352 U | 1/1995 | |
| JP | H10 74342 | 4/1999 | |
| JP | 2014-050321 | 3/2014 | |
| KR | 940008564 A | 5/1994 | |
| KR | 170000173 U | 1/2017 | |

OTHER PUBLICATIONS

Extended European Search Report PCT/US2018020122 App # 18760958.1-1011/3589119 dated Feb. 13, 2020.
Detailed technical Report of Nation of India.
Notice of Reasons for Refusal, Japan Patent Office.
Examiner Report No. 1, Australia.
Office Action from China.

* cited by examiner

ORNAMENT ASSEMBLY

CROSS-REFERENCE TO RELATED APPLICATIONS

This patent application is a continuation of U.S. patent application Ser. No. 16/028,895, filed Jul. 6, 2018, which is a continuation of is a continuation of U.S. patent application Ser. No. 15/699,734, filed Sep. 8, 2017, which is a continuation of U.S. patent application Ser. No. 15/694,035, filed on Sep. 1, 2017, which is a Continuation-in-Part of U.S. patent application Ser. No. 15/638,082, filed on Jun. 29, 2017 and which claims benefit of U.S. Provisional Patent Application No. 62/465,346, filed on Mar. 1, 2017.

This patent application is a continuation of U.S. patent application Ser. No. 16/028,895, filed Jul. 6, 2018, which is a continuation of U.S. patent application Ser. No. 15/699,734, filed Sep. 8, 2017 which is a continuation of U.S. patent application Ser. No. 15/638,082 filed Jun. 29, 2017 which claims benefit of U.S. Provisional Patent Application No. 62/465,346 filed Mar. 1, 2017. All of which are hereby incorporated by reference in their entirety as part of the present disclosure.

FIELD OF THE INVENTION

The present invention relates generally to a decoration and more specifically to at least one ornament assembly that includes a base that substantially encompasses an entire surface area of a bottom wall of a housing and into which base various design elements are irremovably disposed. Said base having a shape that can encompass an interior surface of a housing that is of a non-uniform shape, including, but not limited to a sloped, curved, semi-circular, global and drum-shaped.

BACKGROUND OF THE INVENTION

Decorative ornaments are commonly used in connection with aquariums, terrariums and other housings in addition to being standalone objects. For example, various decorations are regularly placed in aquariums to improve visual aesthetics and to provide fish and/or animals housed in the aquarium with an artificial environment akin to their natural habitat. Such decorations usually include a layer of material such as gravel and/or sand that can be one or more of a variety of colors, live and/or plastic plants, and other decorative objects such as coral, sunken ships, treasure chests, rocks, and/or signage.

To create an aesthetically appealing effect in an aquarium, items must be purchased and then arranged in the aquarium. However, many individuals lack the creativity, know-how, time, and/or the patience to select and decorate an aquarium. Additionally, consumers do not always have access to décor which they desire.

An aquarium, terrarium, or other housing is a habitat for fish, reptiles, or other creatures. It is a delicately balanced ecosystem created for fish, reptiles or other creatures to thrive. Abrupt changes to such an ecosystem can alter the environment and endanger the lives of the fish, reptiles or other creatures. These enclosures require regular cleaning to ensure the viability of life housed therein and the overall cleanliness thereof. This is often a very time-consuming process that requires the temporary removal of fish and/or other animals, movement or removal of gravel and/or other decorative elements and at least in the case of an aquarium, the displacement and discarding of water from the aquarium (usually into a drain or toilet) that requires careful attention not to accidently include gravel or other decorative elements so as to not discard such decorative elements with the displaced water, damaging the elements and/or possibly clogging the drain/toilet into which the water is being discarded.

The soiled gravel and/or other decorative elements must be cleaned or replaced, and regardless of whether the decorative elements are cleaned or replaced, the movement and/or removal of gravel and/or decorative elements in order to clean an aquarium requires a significant commitment in both time and energy to move and/or remove the items, clean the items or replace them with a new scheme and ensure the vitality of the aquatic life housed in the aquarium. Should one decide not to remove all decorative items and water from a housing when cleaning, commonly, material arranged on the base of the aquarium will be displaced and mixed with the water in the housing. If not handled properly, in the case of aquariums, the stirring of loose gravel when adding or moving décor, can alter the environment and create a toxic environment by causing high levels of ammonia gas and nitrates to be released into the aquarium water. The high gaseous levels, which emanate from waste from fish and/or animals in the aquarium and food particles not consumed that naturally break down in the material (e.g., gravel) placed on the base of the aquarium, can often damage the protective body-coating of fish and their delicate fins. The harsh nature of the gases can also lead to the onset of disease to the fish contained in the aquarium, and commonly leads to fish dying soon after being exposed to such gases (e.g., within about twenty-four hours). This is a frequent problem for consumers, especially those new to fishkeeping. The same applies to reptiles and small animals. Thus, there are many challenges and concerns with creating a desired decorative environment, cleaning an aquarium that includes a decorative environment and recreating a decorative environment after cleaning the aquarium.

SUMMARY OF THE INVENTION

Accordingly, the present invention is directed to a decorative ornament assembly that substantially obviates one or more of the problems due to limitations and disadvantages of the related art.

An object of the invention is to provide a decorative ornament assembly that fits within and covers the entire inner surface area of a container, such as a fish tank, all which may have different inner surface widths, lengths, depths and circumferences.

Another object of the invention is to simplify the cleaning process of a housing, such as an aquarium, by allowing a user to quickly remove the decorative ornament assembly in one step rather than having to remove decorative elements in an open container, such as gravel, plants, and ornaments, individually.

Yet another object of the invention is to simplify the decoration process of a holding container, such as an aquarium, by allowing users to insert a decorative ornament assembly with all of the decorative elements affixed to it rather than having to individually purchase and insert various decorative items, such as plants, gravel, and ornaments, into a holding container.

In an embodiment, the present invention is directed to an ornament assembly configured to be arranged within a housing that includes at least one sidewall. The ornament assembly comprises a base delimited at an outer periphery and a plurality of decorative elements that are at least one of irremovably disposed on and partially fixed within the base. The base is configured to extend substantially about an interior space of the housing such that the base is contactable with the at least one sidewall of the housing.

The base can extend across an entire surface area of a portion of the housing such that the entire portion of the housing is covered by the base. Alternatively, the portion of the housing can be entirely covered by two or more bases.

The base can be comprised of at least one of gravel, sand, marbles, stones, plastic, paper, or any other type of suitable base material which are bound together to form a solid structure. The decorative elements can include plants, rocks, sunken ships, treasure chests, statues, signage, castles, and other decorative subject matter that appeals to consumers.

In another embodiment, the present invention is directed to a system of decorating an open container that includes a base having a depth and delimited at an outer periphery and a plurality of decorative elements that are at least one of irremovably disposed on and partially fixed within the base and a housing that includes at least one sidewall. A width and a depth of the base is less than or equal to a width and a depth of an inner surface area of the housing, and the inner surface area of the housing is entirely covered by the base.

The inner surface area of the housing can be entirely covered by two or more bases that are contactable or adjacent to each other to form the decorative ornament assembly. The bases can be adjoined by abutting each other, by a hinge, magnets, or another fastener or apparatus allowing the bases to form the decorative ornament assembly.

The base can be made of at least one of gravel, sand, marbles, stones, rocks, plastic, paper, and a similar solidly formed substance, or a facsimiles thereof, or any other type of suitable base material which are bound together to form a solid structure.

The decorative elements can be at least one of plants, rocks, sunken ships, treasure chests, statues, signage, castles, and other decorative subject matter that appeals to consumers.

DETAILED DESCRIPTION OF EMBODIMENTS OF THE INVENTION

Figure 1A:
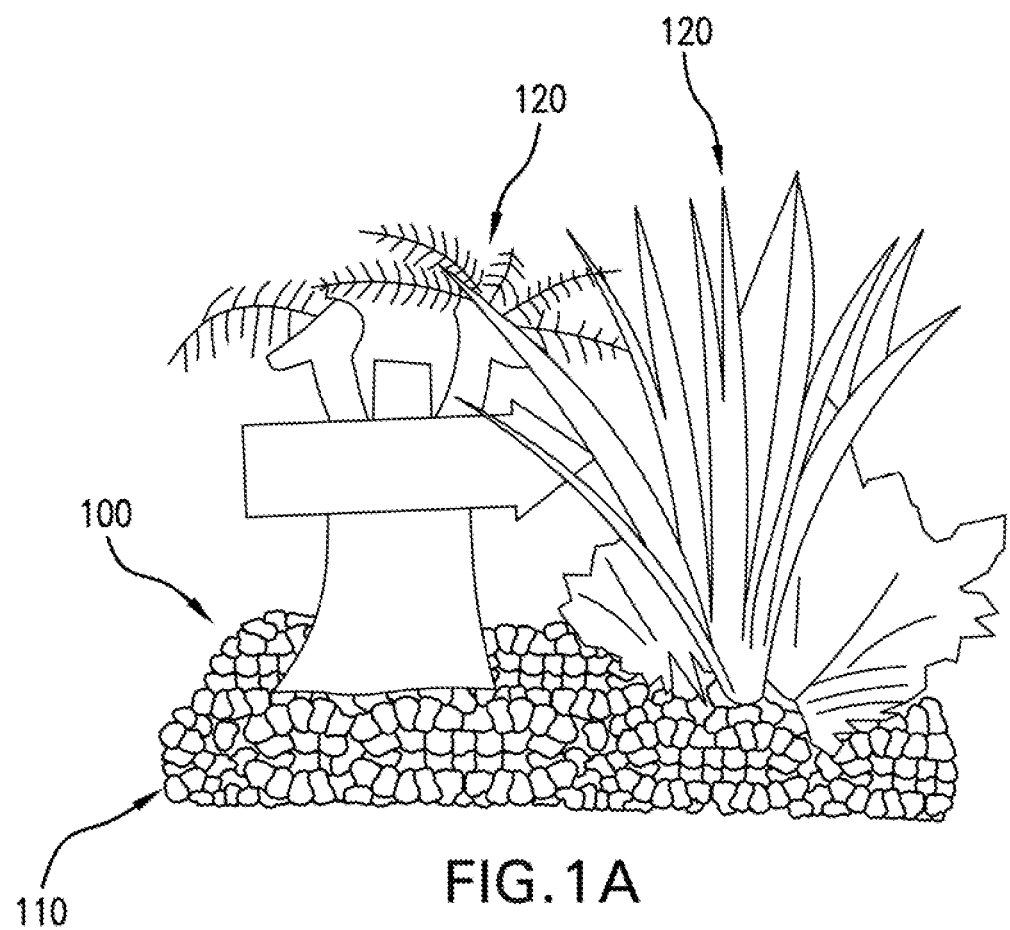
FIG. 1A is a front perspective view of a first embodiment of a decorative ornament assembly of the present invention.

Reference will now be made in detail to embodiments of the invention, examples of which are illustrated in the accompanying drawings. It is noted that the thicknesses of layers and regions in the drawings are exaggerated for clarity.

The decorative ornament assembly not only allows for an aesthetically pleasing appearance in a housing or on a surface, but also reduces the cost of purchasing several items to create such a decorative element, significantly reduces the time, expertise, imagination, creativity, and know-how required to create the desired decorative look and allows for easy removal from a container or from a surface to clean the container or surface and to clean or replace the decorative element.

FIG. 1A is a front perspective view of a first embodiment of a decorative ornament assembly 100 of the present invention. The decorative ornament assembly 100 includes a base 110 that may have varying shapes, widths, depths, and heights depending on its intended use and stylization. The base 110 can be comprised of gravel, sand, marbles, stones, plastic, paper, and/or a similar substance or another material which are bound together using various methods and materials that are well known in the art, such as epoxy or resin bonding, glue, or use of any other adhesive material to form a solid structure and into which design elements 120 are irremovably disposed. The design elements 120 can include, for example, plants, statutes, signage, castles, sunken ships, treasure chests or other decorations are then irremovably disposed on or partially disposed in the base 110. As such, because the design elements 120 stand freely in conjunction with the base 110, they do not require repositioning or the aid of another structure to support the design elements 120 creating various environmental themes, such as an ocean, coral reefs, sunken cities, surfing, sailing, lighthouses on a cliff, forest, etc.

During manufacture of the decorative ornament assembly 100, the decorative elements 120 may be irremovably disposed on or partially in the base 110 by heating the base material, inserting the decorative elements 120 in or on the base material and then cooling the base 110 so the base material hardens and secures the decorative elements 120 therein or thereon. Alternatively, the decorative elements 120 may be inserted into, or attached to, the base 110 material, and then a resin, glue, or other adhesive material may be added to the base 110 so that it hardens into a single decorative ornament assembly.

Figure 1B:
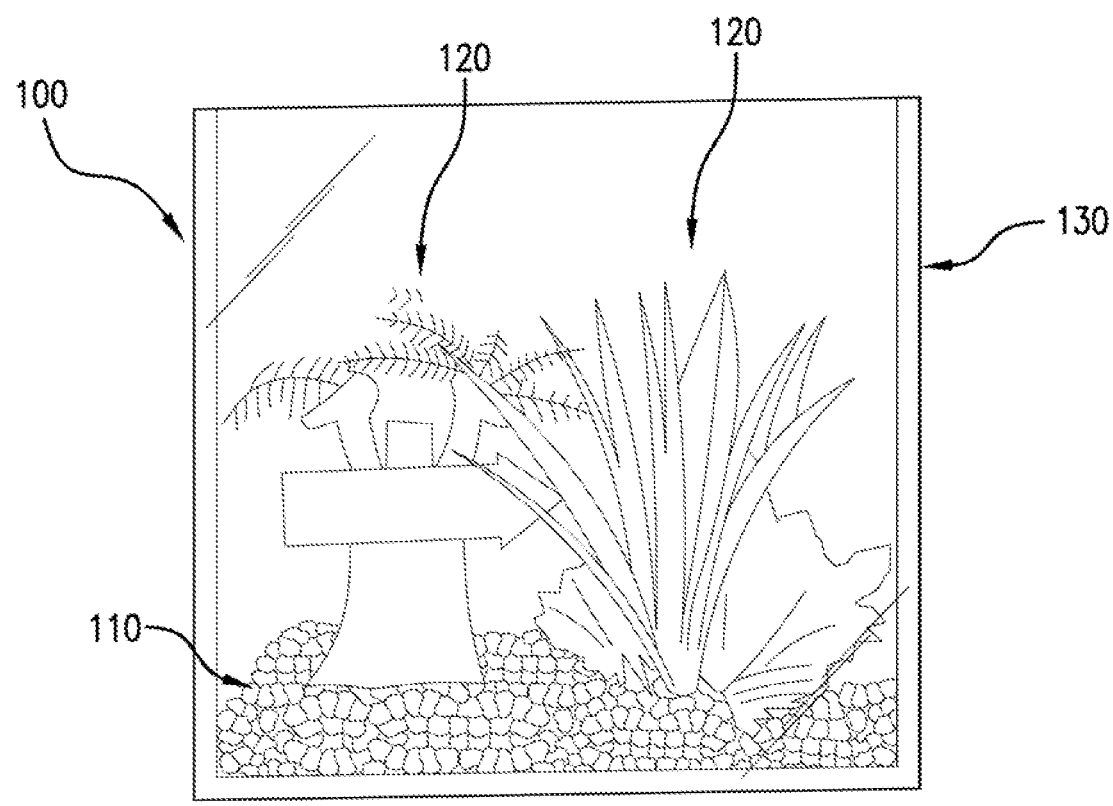
FIG. 1B is a front perspective view of the decorative ornament assembly of FIG. 1A arranged in a housing.

As shown in in FIG. 1B, the base 110 of the decorative ornament assembly 100 is configured such that it encompasses the entire surface area of a bottom wall within a housing 130, such as an aquarium, thereby providing a customized and professionally decorative appearance. Moreover, the decorative ornament assembly 100 can be selectively removed and replaced with an alternative decorative ornament assembly which is also sized to fit on and cover the entire inner bottom surface area of the housing 130.

The base 110 of the ornament assembly 100 has a predetermined width, depth, and height wherein these dimensions allow it to fit along or within the bottom inner surface area of a housing, such as a glass tank or container of other material. The ornament assembly 100 may be sized to fit inside standard sized aquariums (i.e. 2.5, 5, or 10 gallon tanks) or custom shaped tanks and/or other housings or containers comprised of various materials (e.g., glass, composite, plastic, etc.).

FIG. 1B is a front perspective view of a first embodiment of the present invention located in a housing (e.g., a glass container, a glass tank, vase, or a container of another material). As shown in FIG. 1B, the base 110 of the decorative ornament assembly 100 has a width and depth which conforms to the inner surface dimensions of the bottom of the housing 130. If this housing 130 is an aquarium, the user can then add water and fish to the container to complete the aquarium setup.

As the base 110 of the decorative ornament assembly 100 is affixed to the decorative elements 120, a user can simply remove the decorative ornament assembly 100 from a housing 130 by grabbing either the base 110 or decorative elements 120. Removal of the entire decorative ornament assembly 100 from the housing in one step greatly simplifies the process of redecorating or cleaning a housing. For example, when the housing 130 is an aquarium, a user could easily clean the housing 130 by removing any contents thereof, such as fish/animals, removing the decorative ornament assembly 100, and then draining the water contained in the housing 130. The user would then be able to easily clean the entire decorative ornament assembly 100 and the housing 130 and then re-insert the cleaned decorative ornament assembly 100 into the housing 130 that has been cleaned or insert an alternative decorative ornament assembly into the housing 130.

In another embodiment, the base 110 of the decorative ornament assembly 100 can have one or more holes to allow for the insertion of a connecting a device for easier extraction of the decorative ornament assembly 100 from the housing 130. The hole can include a helical ridge or other fastening ridges, allowing a connecting device to fasten into the base 110. In addition, the hole can have a varying depth or extend through the base 110. In instances where the decorative ornament assembly 100 is used in an aquarium, a through hole in the base 110 allows water to pass through the base 110, minimizing resistance when removing the decorative ornament assembly 100 from a housing 130.

The base 110 can be of varying sizes or shapes, including rectangular, square, circular, or any other particular shape in order to fully cover the bottom inner surface of a housing of any shape.

Figure 2A:
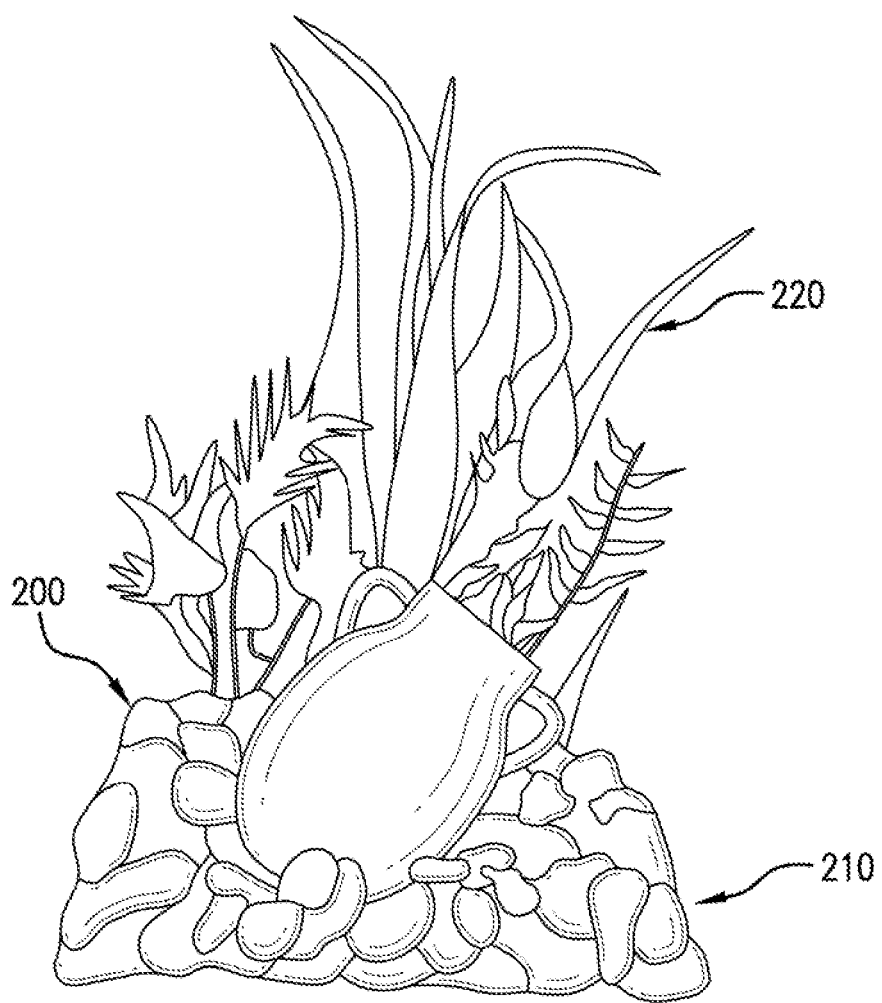
FIG. 2A is a front perspective view of a second embodiment of a decorative ornament assembly of the present invention.

FIG. 2A is a front perspective view of a second embodiment of a decorative ornament assembly 200. The decorative ornament assembly 200 includes a base 210 comprised of gravel and other materials and decorative elements 220 that are fixed to the base 210 and/or each other (e.g., by an adhesive or formed together). By combining the base 210 with decorative elements 220, the decorative ornament assembly 200 can act as a stand-alone decorative ornament or as a decorative centerpiece, such as those often found in restaurants, homes, bars, hotels, and other similar establishments. In such a case, a decorative ornament assembly 200 with various decorative elements 220 can be purchased and quickly and easily set into place without the need to purchase individual items or assemble the items to create a stand-alone decorative ornament or decorative centerpiece. The decorative ornament assembly 200 can be easily replaced, if and when needed, with an alternative decorative ornament assembly, for example, to reflect the different seasons of the year, holidays, occasions, sports, travel, or changes in personal taste in decor.

Figure 2B:
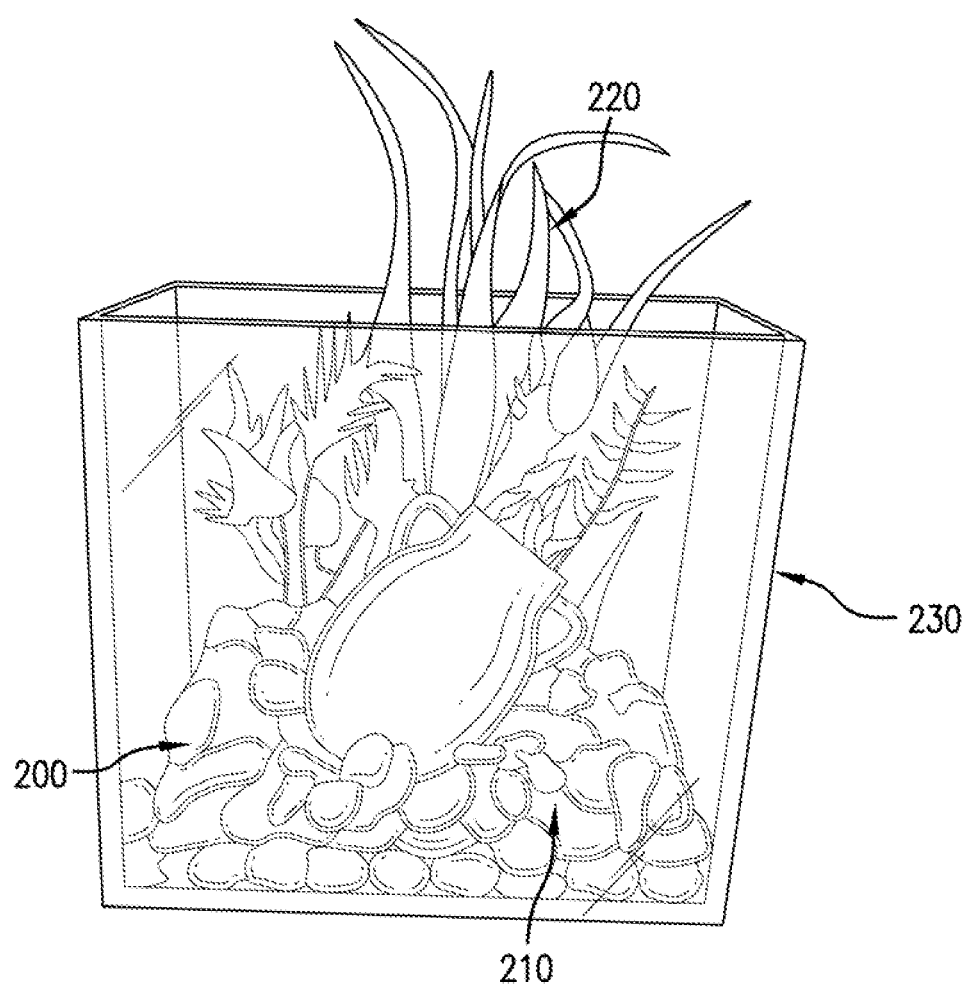
FIG. 2B is a front perspective view of the decorative ornament assembly of FIG. 1A arranged in a housing.

FIG. 2B depicts the decorative ornament assembly 200 arranged within a housing 230. The housing 230 has a square shaped bottom surface area, and the base 210 of the decorative ornament assembly 200 includes a base 210 that has a width and depth that completely encompasses the inner surface area of the bottom of the housing 230.

Although a square open housing 230 is shown in FIG. 2B, the decorative ornament assembly 200 can be arranged in a variety of housings, such as aquariums, terrariums, vases, or any other container. Regardless of the housing in which the decorative ornament assembly 200 is arranged, the user would again gain the benefit of being able to place a complete decorative ornament assembly 200 that includes the base 210 and decorative elements 220 into a housing as opposed to having to purchasing those decorative elements individually and arranging those elements in the housing.

Figure 3:
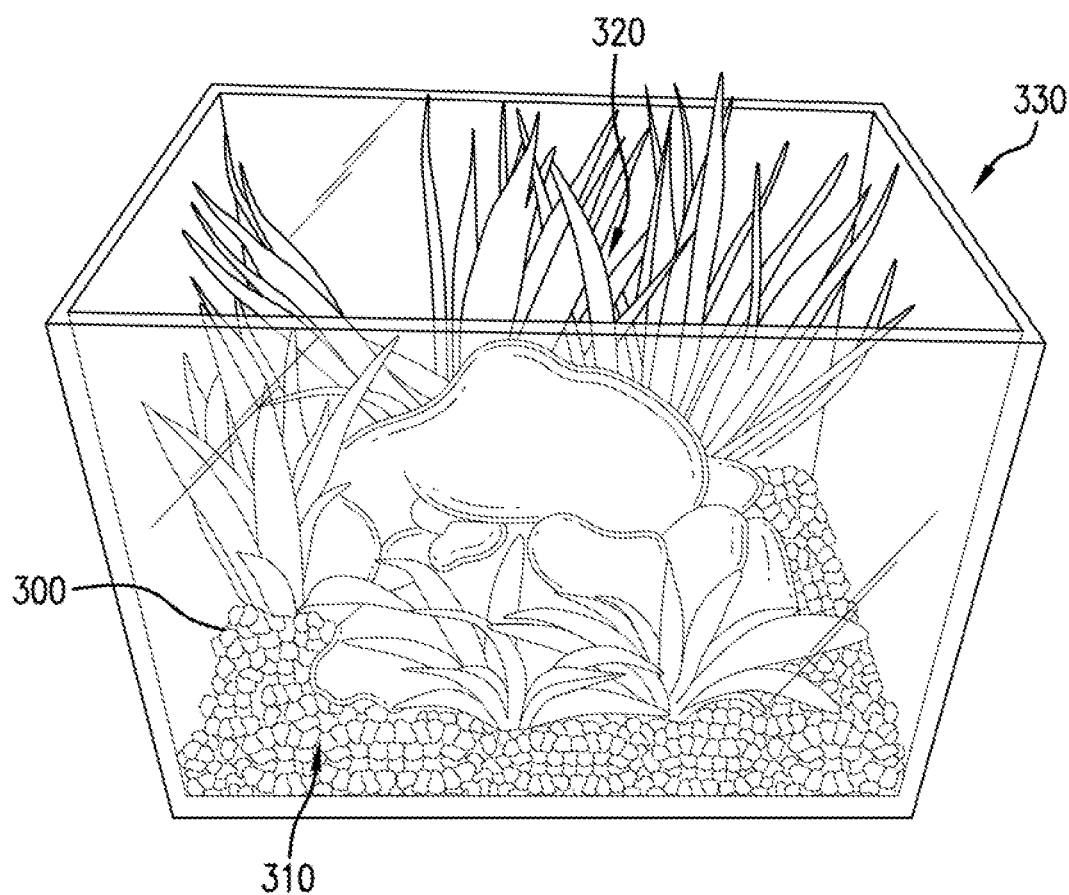
FIG. 3 is a front perspective view of a third embodiment of a decorative ornament assembly of the present invention located in a housing.

FIG. 3 is a front perspective view of a third embodiment of a decorative ornament assembly 300 located within a housing 330. The housing 330 is comprised of panels that can be comprised of, for example, glass, silicone glass, plastic, or another material. As shown, the housing 330 has a rectangular shaped bottom surface area, and the base 310 of the decorative ornament assembly 300 is manufactured to substantially fit within the inner surface area of the housing 330.

Due to manufacturing and shipping limitations, along with concerns regarding weight of the decorative ornament assembly, the base of a decorative ornament assembly can only be so large. For example, a single decorative ornament assembly is not intended for use in large containers, such as a 50-gallon aquarium that has an inner width of 37 inches and a depth of 19 inches because the weight of the ornament assembly would make it difficult for a user to lift the assembly and/or place the assembly in such a container. If a single decorative ornament assembly that includes a base of about one inch in thickness and is made of polypropylene was used in conjunction with such a container, the base of the decorative ornament would have a volume of 703 cubic inches. Polypropylene has a weight of approximately 0.494 ounces per cubic inch. As such, in this example, the weight of the base alone, excluding additional weight provided by any decorative elements attached to the decorative ornament assembly, would be approximately 347 ounces, or nearly 22 pounds. If the base is made of a denser material, such as marbles or gravel, the weight would dramatically increase. Both the cumbersome size and weight of such a large decorative ornament assembly and corresponding base would obviate the benefits of the disclosed invention.

Figure 4:
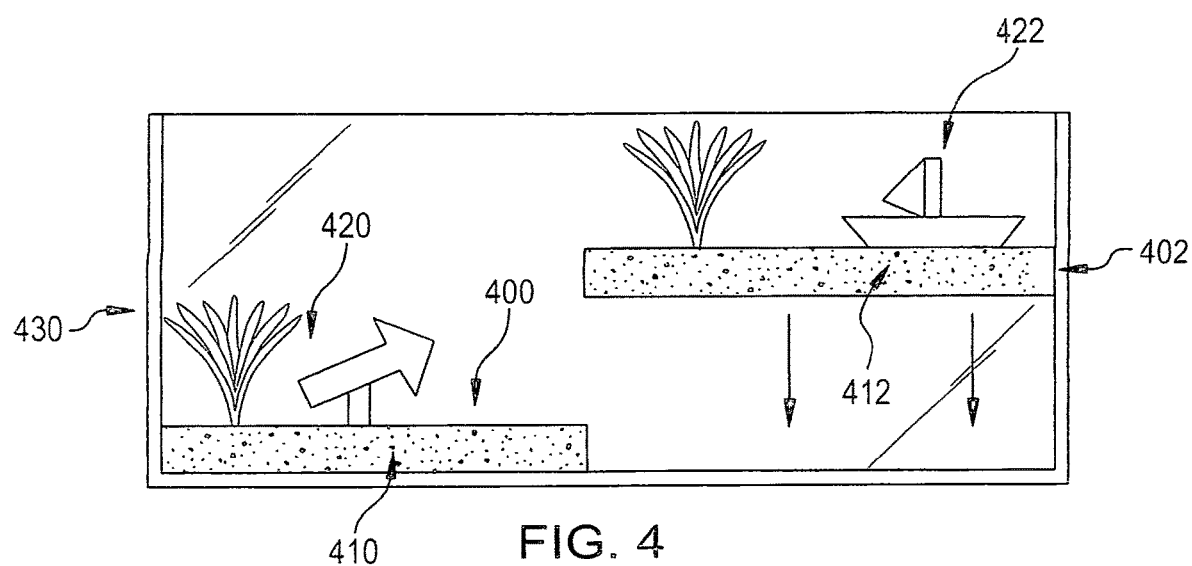
FIG. 4. is a front perspective view of a fourth embodiment of a decorative ornament assembly of the present invention.

In order to cover a large surface area without concern of having to lift a single heavy object and/or risk damaging a surface of a housing when arranging the object thereon, multiple decorative elements can be placed adjacent to each other. As shown in an embodiment in FIG. 4, a first decorative ornament assembly 400 and a second decorative ornament assembly 402 are arranged adjacent to each other in a housing 430. The first decorative ornament assembly 400 includes a base 410 that has a width that is less than width of the inner surface area of the housing 430, but is still manufactured to fit within the inner surface area of the housing 430. The second decorative ornament assembly 402, which is placed adjacent the first ornament assembly 400, includes a base 412 that has a width less than the width of the inner surface area of the housing 430 so as to also fit within the housing 430. The width and length of bases 410 and 412 conforms to the inner surface dimensions of the bottom of the housing 430 and are manufactured in a manner that, when placed contiguously, the bases 410 and 412 fully cover the inner bottom surface of the housing 430. Use of multiple decorative ornament assembly's to fully cover the inner surface area of the housing 430 will keep the weight of each decorative ornament assembly at a minimum.

In order to ensure a decorative ornament assembly that comprises multiple pieces remains adjacent to each other when arranged in a container, the pieces can be fastened to each other by any known means including the use of adhesives, locking mechanisms, magnets, etc. or combined by a hinge system (e.g., living hinge, mechanical hinge system).

In an embodiment, the decorations, including, but not limited to, ornaments and plants, can be releasably connected to the base so that the base and decorations can be shipped and/or packaged separately and various decorations can be replaced/interchanged to vary the décor as desired. This could possibly aid in packaging of the decorations in a further attempt to avoid damage to the decorations and reduce shipping fees.

For example, the base can include openings that can receive a connector from a plant (e.g., male-female connecting system), the base can include projections that extend into a receptor attached to the end of a plant, the base can include magnets that interact with decorations having magnets of an opposite polarity, dowels or the like can be used to connect decorations and the base or any other connection method that is known or may become known can be used to releasably attach decorations to the base.

The aforementioned advantages of the current invention also apply as will be described in further detail below, if the decorative ornament assembly of the present invention is used in connection with other containers, such as terrariums, globes, drums, or as a stand-alone decorative ornament, as opposed to with aquariums.

Figure 5A:
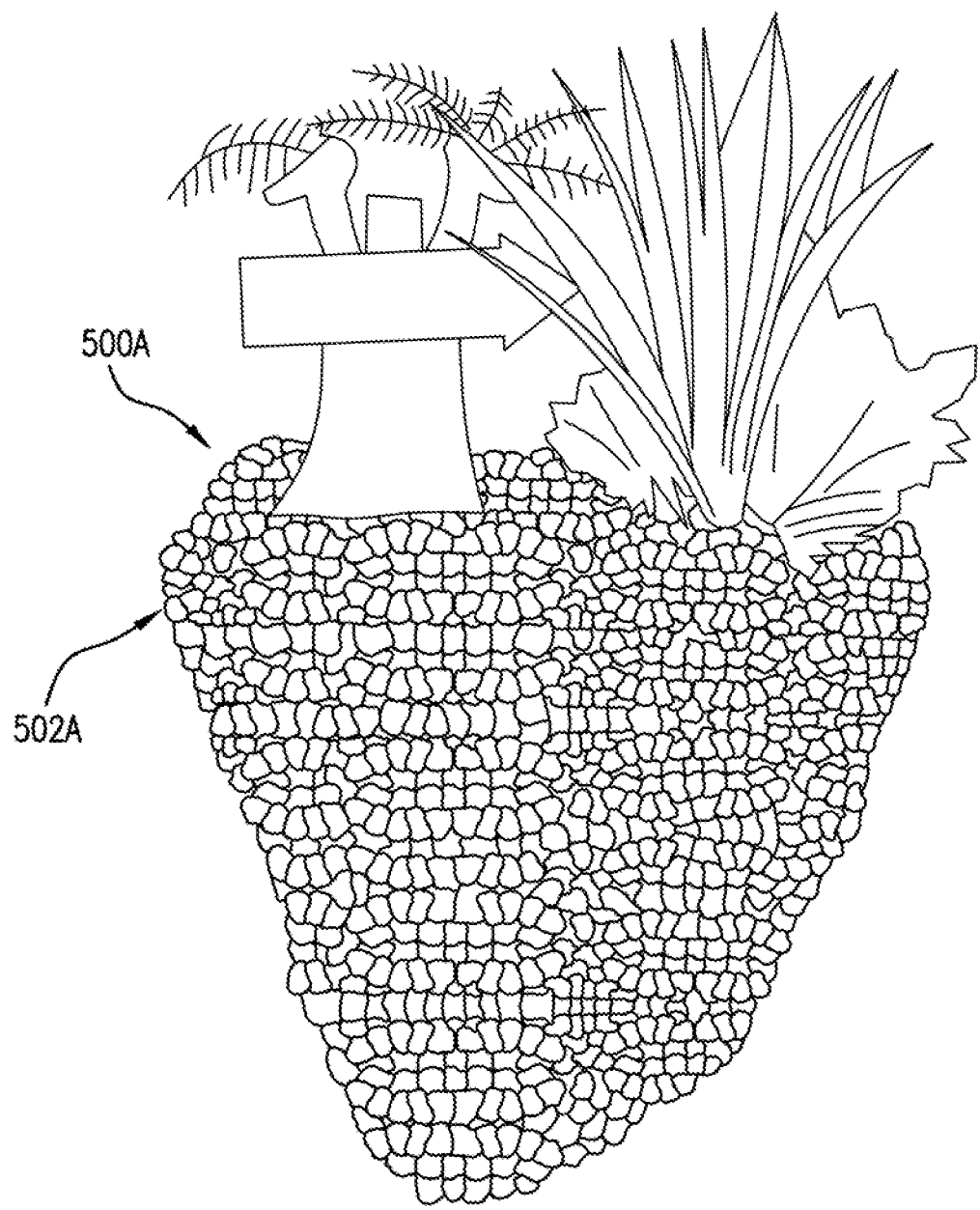
FIGS. 5A and 5B are a front perspective views of a fifth and sixth embodiment of a decorative ornament assembly of the present invention.
Figure 5B:
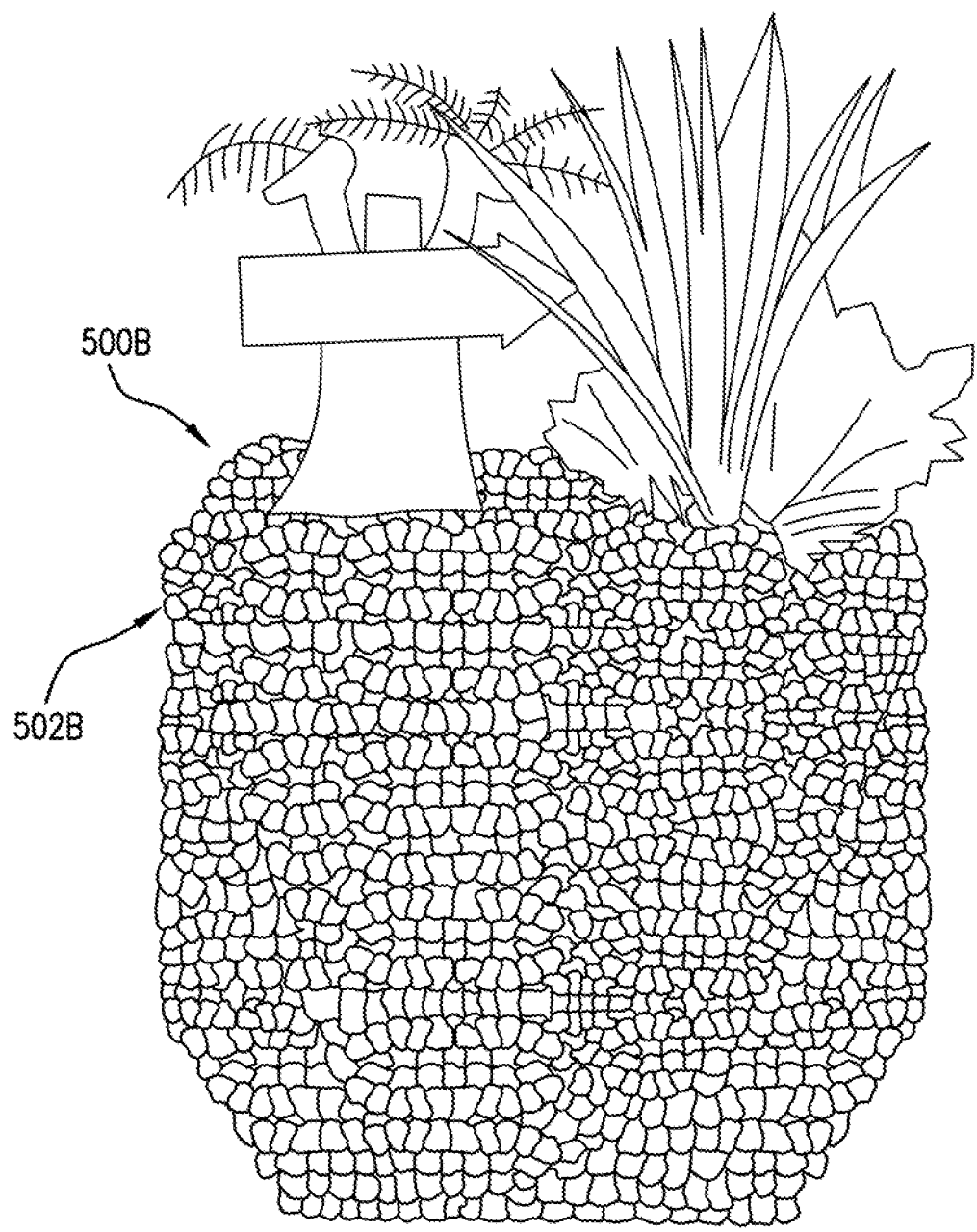

As shown in embodiments in FIG. 5A and FIG. 5B, a decorative ornament assembly, here indicated by reference numerals 500A and 500B, respectively, can include a base 502A, 502B, respectively, that has a depth that can be arranged in a housing that includes a contoured and/or curved sidewall. As such, the base 502A, 502B can substantially encompass an inner surface area of the housing without leaving a gap between the base 502A, 502B and the bottom portion of the housing or requiring gravel, sand, or the like to be placed beneath the base 502A, 502B as a filler, defeating the purpose of the one-piece ornament assembly.

Figure 6:
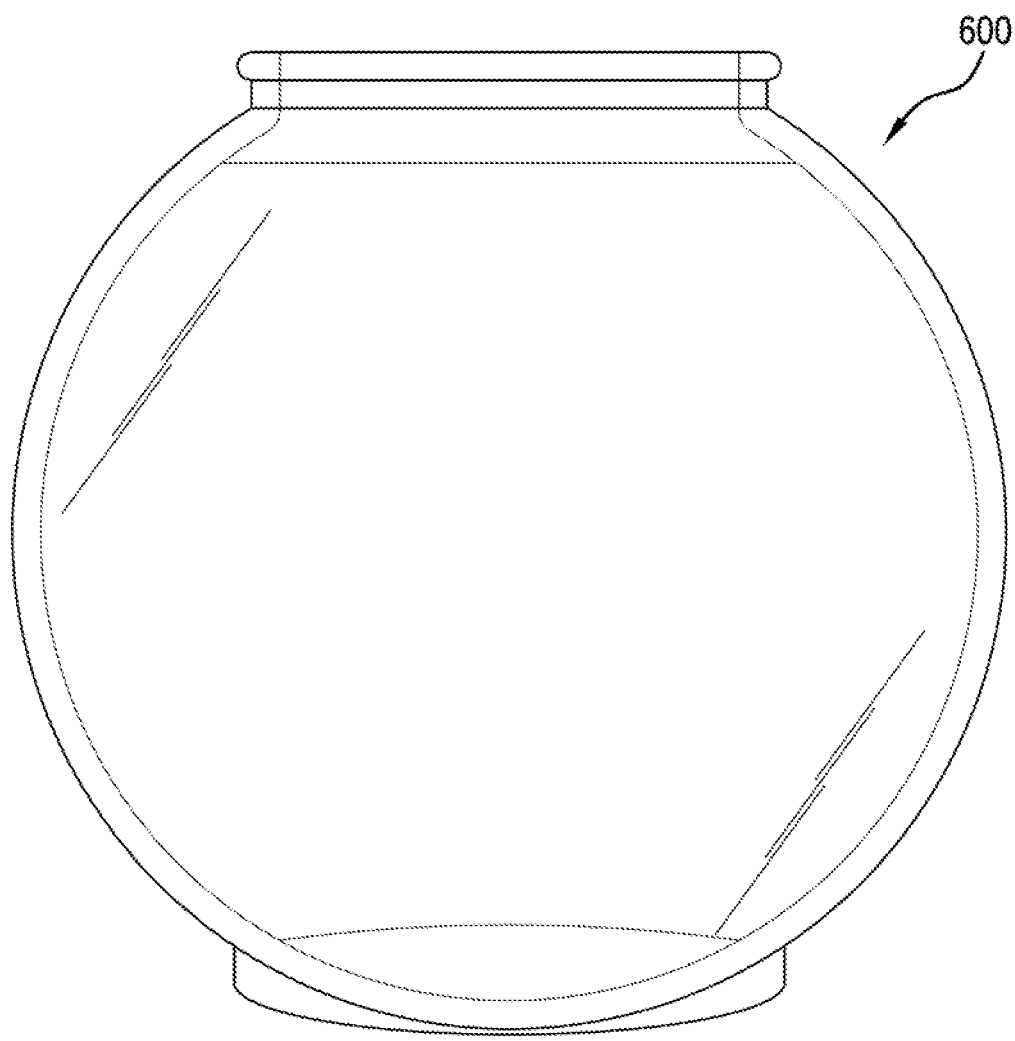
FIG. 6 is a perspective view of a known aquarium shape.
Figure 7:
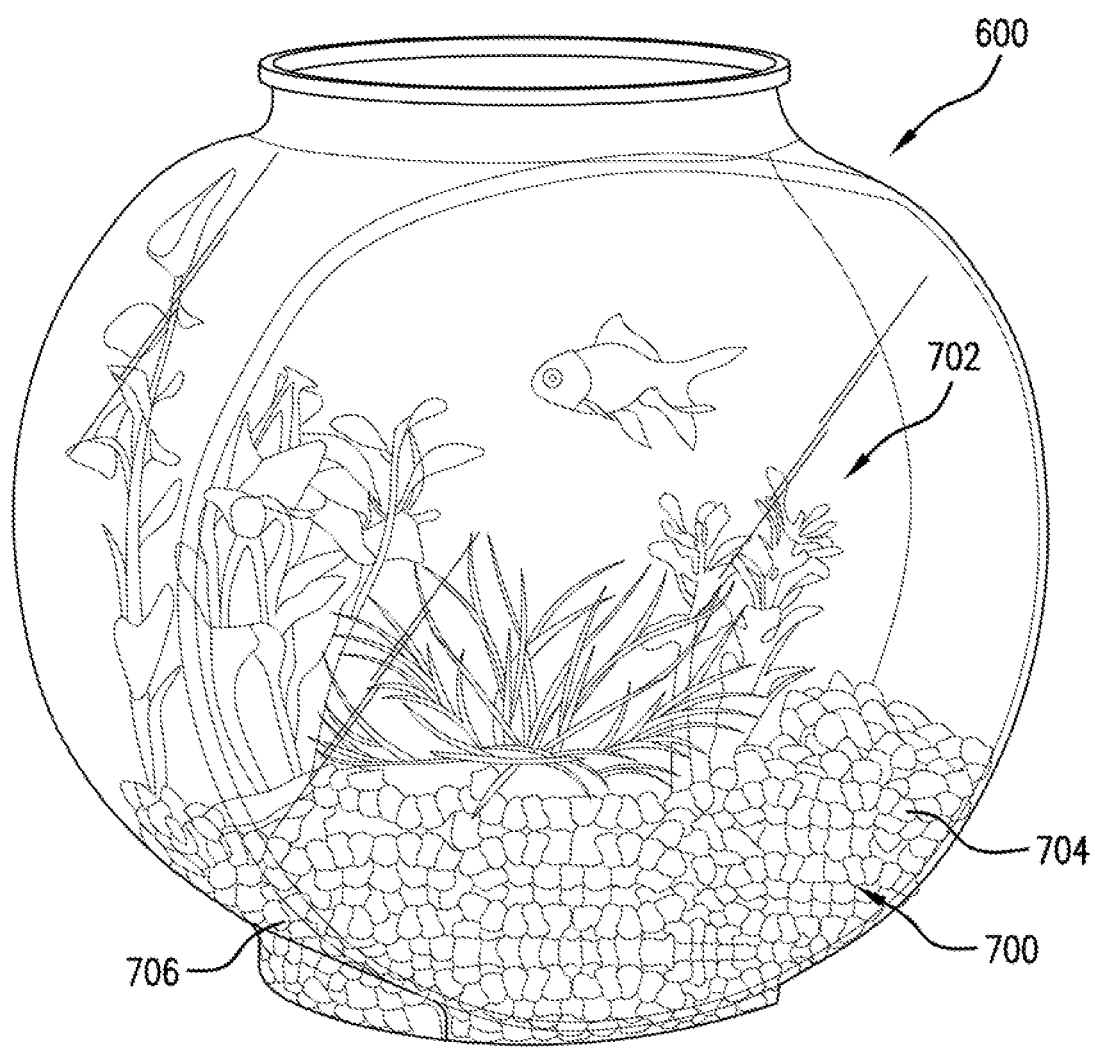
FIG. 7 is a perspective view showing a decorative ornament assembly arranged in the aquarium of FIG. 6.
Figure 8:
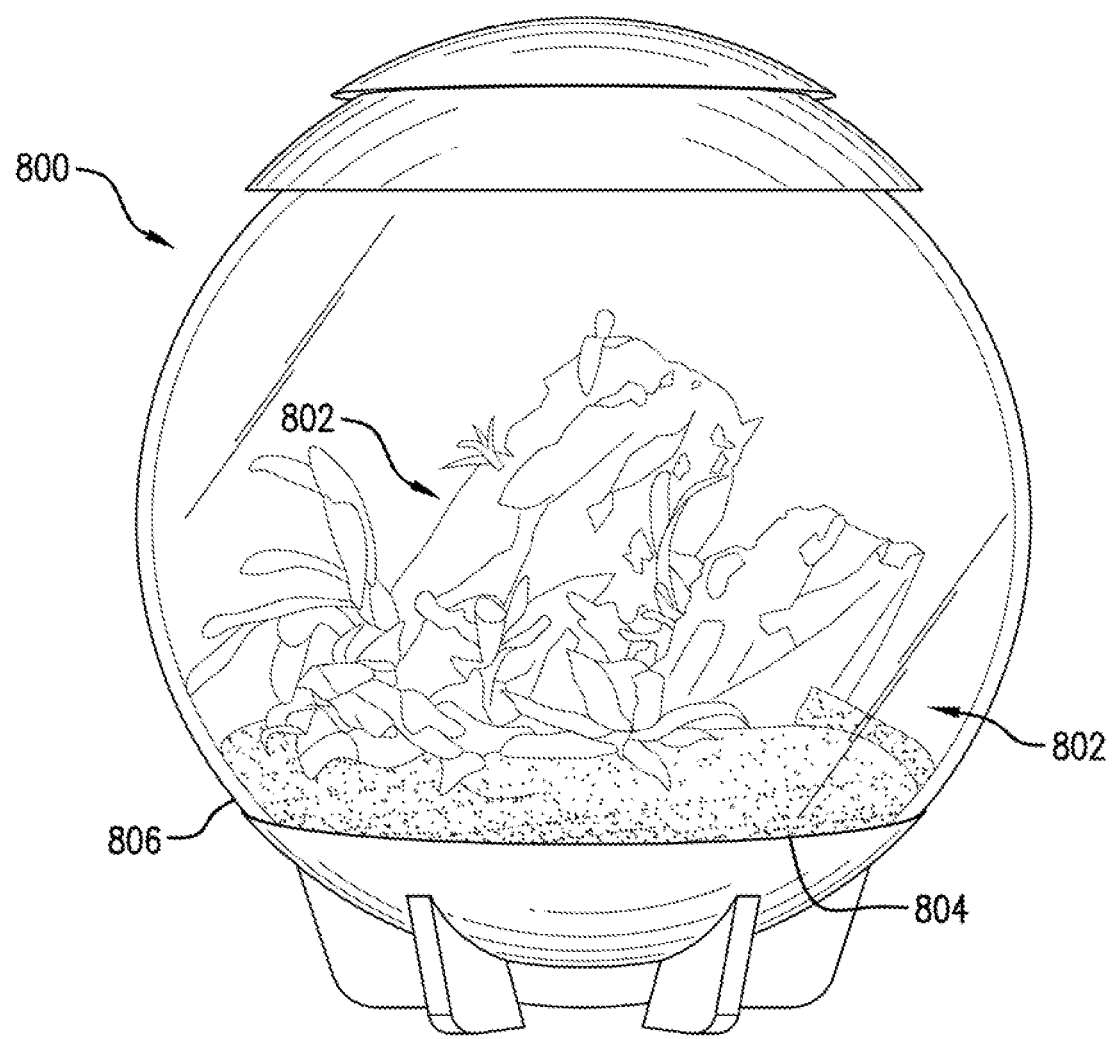
FIG. 8 is a perspective view of a seventh embodiment of a decorative ornament assembly arranged in a housing.

The decorative ornament assemblies of the present invention may have varying shapes, widths, depths, and heights depending on their intended use and stylization. For example, a base 704 of a decorative ornament assembly 700 as can be seen in FIG. 7 that is designed for use with a known housing 600 (see FIG. 6) can include sloping contoured sidewalls 706 such that the base 704 tapers toward a bottom portion of the housing 600. If traditional decorative elements were used in place of the decorative element 702 shown in FIG. 7, cleaning a housing such as the one shown in FIGS. 6 and 7 can be very time consuming and require extensive rearrangement and/or replacement of decorative elements FIG. 8 illustrates a perspective view of another known housing 800 in which a decorative ornament assembly 802 is arranged. As can be seen, the decorative ornament assembly 802 includes a base 804 with sloping sidewalls 806 that substantially contour to an interior space of the housing 800.

Figure 9:
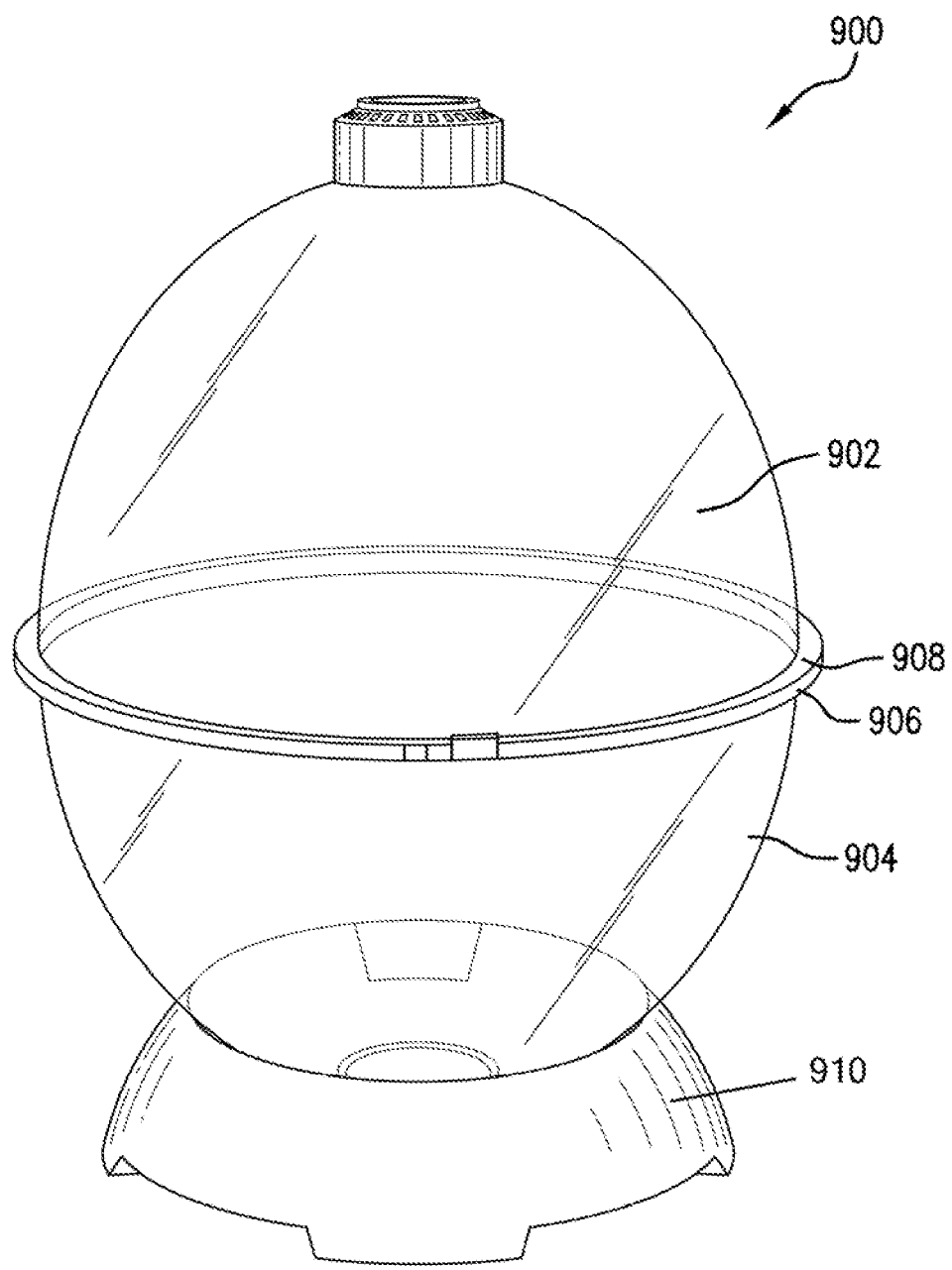
FIG. 9 is another known housing in which a decorative ornament assembly having a shape contoured to a portion of the inner surface area.

FIG. 9 illustrates another known housing 900 that includes a first semi-circular or dome shaped portion 902 that has a first rim 908 and a second semi-circular or dome shaped portion 904 that has a second rim 906 which is contactable with and seals within or around the first rim 908 of the first semi-circular or dome shaped portion 902. Although the container 900 is shown to rest on a base 910, the container 900 can be hung and/or not contain a base as well.

Figure 10:
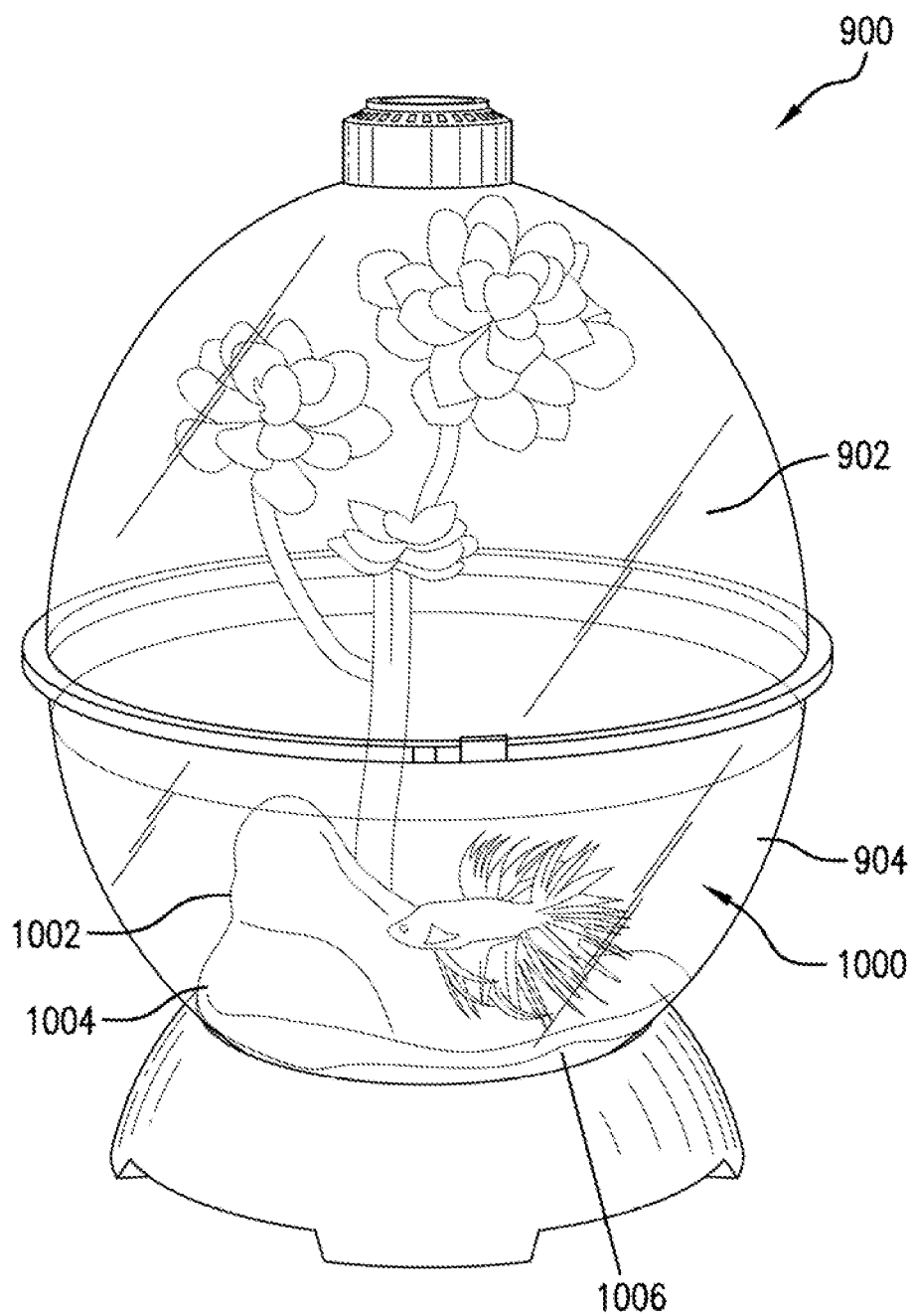
FIG. 10 is a perspective view of the housing of FIG. 9 showing an eighth embodiment of a decorative ornament assembly of the present invention arranged therein.

FIG. 10 depicts a decorative ornament assembly 1000 that is arranged in the housing 900 of FIG. 9. As shown, in order to substantially account for the interior space of the housing 900, the decorative ornament assembly 1000 has a base 1002 with sloping sidewalls 1004 and a substantially linear bottom wall 1006.

The base of all embodiments can be comprised of gravel, sand, marbles, stones, plastic, paper, and/or a similar substance or another material which are bound together using various methods and materials that are well known in the art, such as epoxy or resin bonding, glue, or use of any other adhesive material to form a solid structure and into which design elements are irremovably disposed. The design elements for all embodiments can include, for example, plants, statutes, signage, castles, sunken ships, treasure chests or other decorations are then irremovably disposed on or partially disposed in the base. As such, because the design elements stand freely in conjunction with the base, they do not require repositioning or the aid of another structure to support the design elements creating various environmental themes, such as an ocean, coral reefs, sunken cities, surfing, sailing, lighthouses on a cliff, forest, etc.

Although embodiments of decorative ornament assemblies are shown herein to include substantially linear bases, bases with sloping or conical sidewall, etc., the decorative ornament assemblies of the present invention can include a base having any configuration, including bases with varying depths and shapes to be arranged in a variety of housings, such as aquariums, terrariums, vases, or any other container.

Although the description above and figures contains much specificity, the details provided should not be construed as limiting the scope of the embodiments, but merely as describing some of the features of the embodiments. The description and figures should not to be taken as restrictive and are understood as broad and general teachings in accordance with the present invention. While the embodiments have been described using specific terms, such description is for illustrative purposes only, and it is to be understood that modifications and variations to such embodiments, including, but not limited to, the substitutions of equivalent features and terminology may be readily apparent to those of skill in the art based upon this disclosure without departing from the spirit and scope of the invention.

What is claimed is:

1. A method for decorating or redecorating a housing in a loose-gravel free aquarium, the housing having at least one bottom for defining an inner surface and at least one sidewall, the method comprising the steps of:

providing a plurality decorative ornament assemblies having a visual design, accessing any one or any combination of the plurality of decorative ornament assemblies the decorative ornament assemblies creating an environmental theme and each including at least one base and one or more decorative element, the at least one base having a bottom surface as well as an outer periphery, the at least one base forming a solid structure to which said one or more decorative elements are affixed in a position thereon and upwardly extend therefrom, the one or more decorative element being permanently affixed to the at least one base such that when decorating or redecorating each decorative ornament assembly is removed as a single unit at least one of said decorative elements being spaced from said outer periphery of its respective at least one base, the plurality of decorative ornament assemblies having a combined base and bottom surface such that the combined bottom surface of the combined base has the same size and shape as that of the bottom inner surface area of the housing and any of the bases of the combined bases abuts at least one other base of the combined bases said plurality of decorative ornament assemblies being located inside said housing such that the bottom inner surface area of said housing is entirely covered by the combined bottom surface of said plurality of decorative ornament assemblies combined base or combined bases, wherein the outer periphery of the plurality of decorative ornament assemblies combined base or combined bases slidably abuts said at least one sidewall of the housing;

removing a selected decorative ornament assembly or combination of assemblies from said plurality of decorative ornament assemblies from said housing by grabbing said at least one of said decorative elements spaced from its respective at least one base outer periphery, in order to lift out the selected decorative ornament assembly or combination of assemblies;

decorating or redecorating the aquarium by placing a different decorative ornament assembly or combination of assemblies from the plurality of decorative ornament assemblies or by replacing the selected decorative ornament assembly or combination of assemblies.

2. The method of claim 1, further comprising: the at least one base of the decorative ornament assembly including one or more of: non loose gravel, sand, marbles, stones, plastic, or paper that are secured together.

3. The method of claim 1, further comprising the decorative elements are one or more of plants, rocks, sunken ships, treasure chests, statues, signage and castles.

4. A method for decorating or redecorating and cleaning a fish tank housing in a loose-gravel free aquarium, the housing having at least one bottom for defining an inner surface area and at least one sidewall, the method comprising the steps of:
providing a plurality decorative ornament assemblies, accessing any one or any combination of the plurality of decorative ornament assemblies, the decorative ornament assemblies creating an environmental theme and each including at least one base and one or more decorative elements, the at least one base having a bottom surface as well as an outer periphery; the at least one base forming a solid structure to which said one or more decorative elements are affixed in position thereon and upwardly from the top of the at least one base, the one or more decorative elements being permanently affixed to the at least one base such that when decorating or redecorating each decorative ornament assembly is removed as a single unit; without the aid of a separate supporting structure, at least one of said decorative elements being spaced from its respective outer periphery of said at least one base, the plurality of decorative ornament assemblies having a combined base and bottom surface such that the combined bottom surface of the combined base has the same size and shape as that of the bottom wall inner surface area of the housing;

removing said one or more fish, reptiles or animals from said housing;

removing any one or any combination of the plurality of decorative ornament assemblies from said housing by grabbing said at least one of said decorative ornament elements spaced from its respective at least one base outer periphery in order to lift out said decorate ornament assemblies;

cleaning the housing and the selected one or combination of decorative ornament assemblies and replacing the cleaned selected one or combination of decorative ornament assemblies in the housing; or redecorating by placing a different decorative ornament assembly or combination of assemblies from the plurality of decorative ornament assemblies or by placing an additional decorative ornament assembly in the housing, and wherein the unique ornament design of the first decorative ornament assembly or a replacement decorative ornament assembly or assemblies creates a new décor.

5. The method of claim 4, further including the steps of:
selecting the additional decorative ornament assembly having a another design that is the same as or different from any of the decorative ornament assemblies of the plurality of decorative ornament assemblies, said additional decorative ornament assembly creating an environmental theme and including at least one base and one or more decorative elements, the at least one base having a bottom surface as well as an outer periphery, the at least one base of the additional ornament assembly forming a solid structure, to which said one or more decorative elements are affixed in position thereon and upwardly extend therefrom, the one or more decorate elements being supported only by the at least one base and permanently affixed thereto; at least one of said decorative elements being spaced from said outer periphery of said at least one base, the bottom surface of the additional decorative ornament assembly at least one base having the same size and shape as that of the bottom inner surface area of the housing and the combined bases of the first and second decorative ornament assemblies having the same shape; and wherein the step of redecorating further comprises:
inserting said additional decorative ornament assembly into said housing such that the bottom inner surface area of said housing is entirely covered by the bottom surface of said additional decorative ornament assembly the method further comprising the steps of:
adding water to said housing, and
adding said one or more fish, reptiles or animals into the housing.

6. The method of claim 5, further including the steps of:
wherein the bottom inner surface area of said housing is entirely covered by the combined bottom of said decorative ornament assemblies at least one combined base or by the additional decorative ornament assembly base, wherein the outer periphery of the plurality of decorative ornament assemblies at least one combined base or the additional decorative ornament assembly base slidably abuts said at least one side all of the housing adding water to said housing and
adding said one or more fish, reptiles or animals into the housing.

7. The method of claim 4, further comprising: the at least one base of the decorative ornament assembly including on or more of gravel, sand, marbles, stones, plastic, or paper that are secured together.

8. The method of claim 4, further comprising the decorative elements are one or more of plants, rocks, sunken ships, treasure chests, statues, signage and castles.

9. A method for decorating and cleaning a housing; the housing including a bottom having an inner surface area and a plurality of sidewalls, the method comprising the steps of:

providing first and second decorative ornament assemblies, accessing the first and second decorative ornament assemblies, each decorative ornament assembly including at least one base and one or more decorative elements, each of the at least one base having a bottom surface delimited at an outer periphery, the at least one base of the decorative ornament assembly forming a solid structure to which said one or more decorative elements are affixed in position thereon and upwardly extend from the top of the at least one base, the one or more decorative elements being permanently affixed to the at least one base such that when decorating or redecorating each decorative ornament assembly is removed as a single unit; at least one of said decorative elements being spaced from said outer periphery of its respective at least one base; the combined bottom surface of the at least one combined base of the first and second decorative ornament assemblies having, when abutting one another, the same size and shape as that of the bottom wall inner surface area of the housing and the at least one base of each of the first and second decorative ornament assemblies having the same shape; the first and second decorative ornament assemblies creating an environmental theme;

the at least one base of each of the first and second ornament assemblies being located inside said housing and abutting each other such that the bottom inner surface area of said housing is entirely covered by the combined bottom surface of said first and second decorative ornament assemblies at least one combined base with the outer periphery of each respective decorative ornament assembly at least one base slidably abutting the plurality of sidewalls of the housing; wherein any of the bases of the combined bases abuts at least one other base of the combined bases or any of the bases of the combined bases abuts at least one wall, removing the first and second decorative ornament assemblies from said housing by grabbing said respective at least one of said decorative elements of each of said first and second decorative ornament assemblies located spaced from its respective at least one base outer periphery in order to lift out decorative ornament assemblies; and removing the water from said housing;

cleaning the housing; and replacing the first or second or both decorative ornament assemblies;

wherein the first and second decorative ornament assemblies bases abut each other.

10. The method of claim 9, further comprising: the at least one base of the decorative ornament assemblies being one or more of: sand, marbles, stones, plastic, or paper that are secured together.

11. The method of claim 9, further comprising the decorative elements are one or more of plants, rocks, sunken ships, treasure chests, statues, signage and castles.

12. A method for decorating or redecorating a housing, the method comprising the steps of:

providing first and second decorative ornament assemblies, accessing the first and second decorative ornament assembles, the decorative ornament assemblies creating a unique environmental theme and each including at least one base and one or more integral decorative elements, the at least one base having a bottom surface as well as an outer periphery, the at least one base of the one or more decorative elements forming a solid structure to which said one or more decorative elements are affixed in position thereon and upwardly extend from the top of the at least one base, the one or more decorative elements being permanently affixed to the at least one base such that when decorating or redecorating each decorative ornament assembly is removed as a single unit; at least one of said decorative elements being spaced from said outer periphery of its respective at least one base, the combined bottom surface of the at least one combined base having the same size and shape as that of the bottom inner surface area of the housing and the at least one base of each of the first and second decorative ornament assemblies having the same shape;

said ornament assemblies being located inside said housing such that the bottom inner surface area of said housing is entirely covered by the combined bottom surface of said decorative ornament assemblies at least one combined base with the outer periphery of the ornament assembly at least one combined base slidably abutting said at least one sidewall of the housing;

removing either said first or second ornament assembly and integral at least one base from said housing by grabbing said at least one of said decorative elements spaced from said at least one base outer periphery in order to lift out said solid at least one base and integral ornament assembly;

redecorating by placing a different decorative ornament assembly with an integral at least one base in the housing.

13. The method of claim 12, further comprising: the at least one base of the decorative ornament assembly including one or more of: sand, marbles, stones, plastic, or paper that are secured together.

14. The method of claim 12, further comprising the decorative elements are one or more of plants, rocks, sunken ships, treasure chests, statues, signage and castles.

\* \* \* \* \*